United States Patent [19]

Lundebrek

[11] 3,926,456
[45] Dec. 16, 1975

[54] DRAW PIN SAFETY LOCK DEVICE
[76] Inventor: Kenneth A. Lundebrek, Rte. 1, Benson, Minn. 56215
[22] Filed: Feb. 20, 1975
[21] Appl. No.: 551,272

[52] U.S. Cl. ............................... 280/515; 280/507
[51] Int. Cl.² .......................................... B60D 1/02
[58] Field of Search .................... 280/515, 507, 511

[56] References Cited
UNITED STATES PATENTS

| | | | |
|---|---|---|---|
| 2,654,613 | 10/1953 | Blair et al. | 280/515 |
| 2,845,281 | 7/1958 | Holder et al. | 280/515 X |
| 3,479,057 | 11/1969 | Miller | 280/511 |
| 3,685,864 | 9/1972 | Hall | 280/515 |
| 3,794,357 | 2/1974 | Frye | 280/515 |

FOREIGN PATENTS OR APPLICATIONS

| | | | |
|---|---|---|---|
| 737,232 | 9/1955 | United Kingdom | 280/515 |

Primary Examiner—Leo Friaglia
Attorney, Agent, or Firm—Williamson, Bains & Moore

[57] ABSTRACT

The draw pin safety lock device for a draw pin connection between the drawbar of a towing vehicle, such as a tractor, and the tongue of a towed implement includes a mounting member attached to the drawbar adjacent the draw pin. A keeper arm is pivotally mounted on the mounting member and is yieldably urged into engaging relation with the upper end of the draw pin to thereby yieldably resist upward movement of the draw pin. The keeper arm may be pivoted through an overcenter position to a release position to permit removal of the draw pin.

4 Claims, 2 Drawing Figures

DRAW PIN SAFETY LOCK DEVICE

SUMMARY OF THE INVENTION

This invention relates to a lock device, and more specifically to a safety lock device for the articulated hitch connection between a towing vehicle and a towed implement.

The conventional hitch connection between a towing vehicle, such as a tractor, and a towed implement comprises a draw pin which extends between the clevis on the implement tongue and the apertured drawbar of the towing vehicle. The lower end of the draw pin is apertured and is retained in place by a cotter key. This means for retaining the draw pin in place has proven to be unreliable and has often resulted in the towed implement becoming accidentally disconnected from the tractor while the latter is towing the implement.

It is therefore a general object of this invention to provide a novel safety lock device for the articulated draw pin connection between the drawbar of the towing vehicle and the clevis on the tongue of the towed vehicle.

More specifically, the draw pin safety lock device includes a mounting member attached to the drawbar and having a keeper arm which is urged into engaging relation with the upper end of the draw pin and which yieldably resists upward movement of the draw pin. The keeper arm, however, may be pivoted to an over-center release position to permit removal of the draw pin as desired.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is an exploded perspective view of the novel draw pin safety lock device; and FIG. 2 is a side elevational view illustrating the manner in which the draw pin safety device is applied to the articulated hitch connection between the drawbar and the clevis of the tongue, and with certain parts thereof broken away for clarity.

DESCRIPTION OF THE PREFERRED EMBODIMENTS OF THE INVENTION

Figure 1:
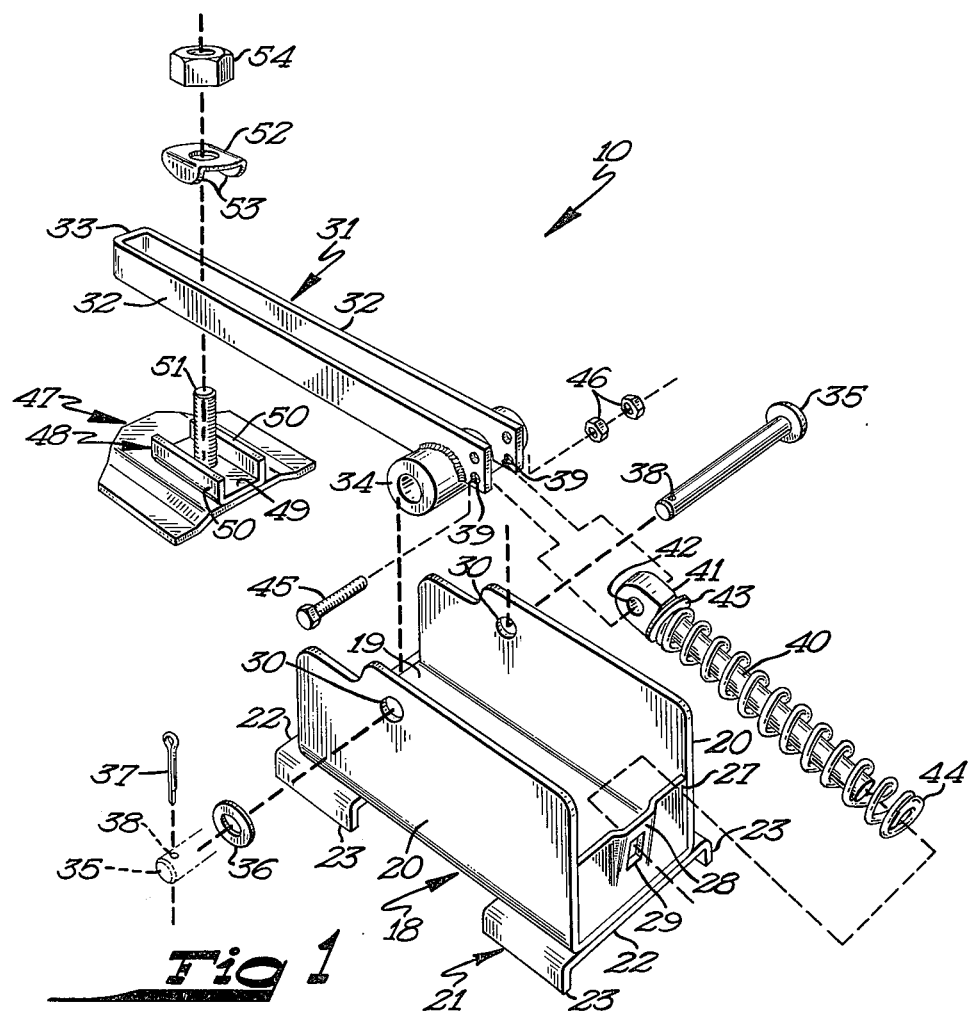

Referring now to the drawings, it will be seen that one embodiment of the novel draw pin safety lock device, designated generally by the reference numeral 10, is there shown. The lock device 10 serves as a releasable safety lock means for the articulated hitch connection between the drawbar 11 of a towing vehicle (not shown) and the implement tongue 12 of a towed vehicle (also not shown). It will be noted that the rear end portion of the drawbar 11 has a vertically extending opening 14 therein while the forward end of the implement tongue 12 has an apertured clevis 13 thereon. The apertured rear end portion of the drawbar is positioned between the clevis 13, and a conventional, vertically disposed draw pin 15 extends therethrough to define an articulated hitch connection. It will be seen that the draw pin 15 is provided with an enlarged head and that spacers or washers 17 are disposed between the head 15 of the draw pin and the upper arm of the clevis 13.

In the conventional draw pin connection, the lower end of the draw pin is apertured and a cotter key is extended through the aperture to prevent accidental displacement of the draw pin from the drawbar and implement tongue. The safety lock device 10 obviates the need of a cotter key and provides a positive lock means for retaining the draw pin in place. The lock device 10 includes a generally channel-shaped mounting member 18 comprised of a substantially flat web or base 19, having a pair of flanges 20 integrally formed therewith and projecting upwardly therefrom. A pair of longitudinally spaced apart inverted U-shaped mounting elements 21 are affixed to the lower surface of the web 19 and each includes a base 22 having a pair of flanges 23 affixed thereto and extending downwardly therefrom. It will be noted that the mounting elements 21 engage the upper surface of the drawbar 11 so that the flanges 23 of the mounting elements are disposed in engaging relation with opposite sides of the drawbar. The web 19 of the mounting member 18 has a centrally located opening therein which is disposed in registering relation with an opening 24 in the drawbar 11. A bolt 25 extends through the opening and is secured in place by a nut 26.

A plate 27 is rigidly affixed to the base 19 and flanges 20 of the mounting member 18 adjacent the forward end thereof. The plate 27 is provided with a forwardly struck central portion 28 having an opening 29 therethrough. Each of the flanges 20 of the mounting member 18 also has an opening 30 therein adjacent the upper edge thereof and adjacent the rear portion thereof.

The safety lock device 10 also includes an elongate keeper arm 31 which is comprised of a pair of elongate, substantially flat, longitudinal elements disposed in substantially parallel relation and fixedly connected together adjacent the rear end by a web 33. The rear end portion of the keeper arm 31 is provided with a sleeve or trunion 34 which is affixed thereto and projects laterally outwardly therefrom.

The trunion 34 is disposed in registering relation with respect to the openings 30 in the flanges 20, and a pivot bolt extends through the trunion and through the openings 30 to pivotally mount the keeper arm 31 on the mounting member 18. A washer 36 is disposed around the pivot bolt 35 and the cotter pin 37 extends through an opening 38 in the end of the bolt to secure the pivot bolt on the mounting member 18.

The forward end portions of the longitudinal elements 32 of the keeper arm 31 are provided with openings 39 therein, as best seen in FIG. 1. An elongate rod 40 having a flattened head 41 at its rear end provided with an opening 42 therein, is positioned between the longitudinal elements 32 of the keeper arm. A threaded bolt 45 extends through the openings 39 and the opening 42 in the flattened head 41 and suitable nuts 46 secure the bolt 45 in place.

A helical spring 44 is positioned around the elongate rod 40 and one end of the spring 44 engages a collar 43 mounted on the rear end portion of the rod 40. The forward end portion of the rod 40 projects through the opening 29 in the plate 27, the spring 44 engaging the plate 27.

The rear end portion of the keeper arm 31 has an enlarged downwardly concave keeper plate 47 mounted thereon for movement therewith. In this respect, the upper surface of the keeper plate 47 has a channel member 48 affixed thereto and comprised of a base 49 having a pair of flanges 50 integral therewith and projecting upwardly therefrom. The base 49 of the channel member 48 has an elongate threaded bolt or stud 41 affixed thereto and projecting upwardly therefrom. The stud 51 projects between the longitudinal elements 32 of the keeper arm adjacent the rear end thereof, and is threadedly engaged by a lock nut 54. A lock washer 52 having downturned flanges 53 is interposed between the keeper arm and nut 54.

Figure 2:
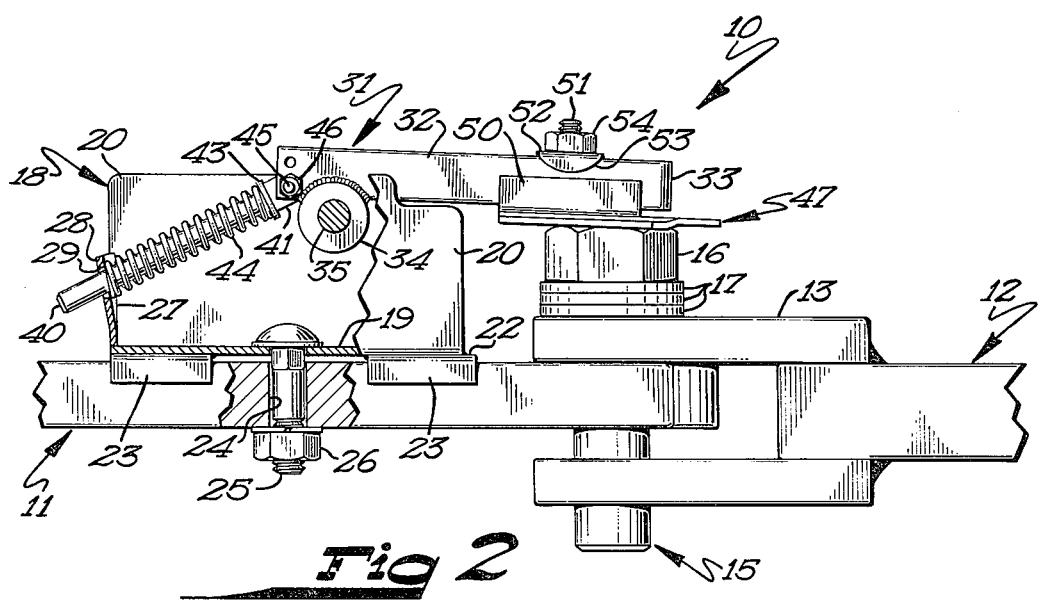

In use, the draw pin safety lock device 10 will be mounted on the rear end portion of the drawbar, adjacent the draw pin connection between the drawbar and implement tongue. The keeper arm will be pivoted from the position illustrated in FIG. 2 in a counter-clockwise or forward direction through an overcenter position against the bias of the helical spring 44. When the keeper arm is swung from the locking position as illustrated in FIG. 2 in a counter-clockwise direction to the release position, it will remain in the released position after it has passed the overcenter point. This allows the tongue to be connected to the drawbar by means of the draw pin 15. Thereafter, the keeper arm will be pivoted in a clockwise direction to the locking position as seen in FIG. 2. As soon as the keeper arm is swung through the overcenter position to the locking position, the helical spring 44 will urge the keeper arm into engaging relation with the upper surface of the head 16 of the draw pin 15. Thus the keeper arm will retain the draw pin in this coupled relation with the drawbar and tongue, but will permit upward yielding movement of the draw pin relative to the tongue 12 and the drawbar 11.

It will therefore be seen that by utilizing a spring-urged keeper arm which is yieldably urged into engaging relation with the draw pin, the draw pin is not only positively retained in place, but the draw pin is also capable of yieldable vertical movement which minimizes the chance of damage to the hitch connection even when traversing relatively rough terrain.

It will be also seen that the spring-urged keeper arm not only positively retains the draw pin in place when the keeper arm is in the locked position but it will be noted that the keeper arm may be readily pivoted through an overcenter position to a release position when it is desired to couple or uncouple the towed vehicle from the tractor.

Thus it will be seen that I have provided a novel draw pin safety lock device, which is not only of simple and inexpensive construction, but one which functions in a more efficient manner than any heretofore known comparable device.

What is claimed is:

1. A draw pin safety lock device for the vertically disposed draw pin between the drawbar of a towing vehicle and the tongue of a towed implement, the draw pin having an enlarged head at its upper end and extending vertically through openings in the lapped end portions of the drawbar and tongue to define an articulated hitch connection between the towing vehicle and implement, said device comprising:

a mounting member adapted to be rigidly mounted on the drawbar or tongue adjacent the draw pin, an elongate keeper arm, means pivotally mounting said keeper arm on said mounting member for pivotal movement about a substantially horizontal transverse axis between a locking position and a release position, said keeper arm having one end portion thereof adapted to overlie and engage the upper surface of the draw pin when the keeper arm is in the locking position, yieldable means interconnected with the keeper arm and said mounting member and yieldably urging the keeper arm into engaging relation with the draw pin when the keeper arm is in the locking position, said keeper arm being pivotal through an overcenter relation against the bias of said yieldable means when shifted to the release position.

2. The safety lock device as defined in claim 1, wherein said mounting member is of channel-shaped configuration and is adapted to be mounted on said drawbar adjacent the draw pin connection, said keeper arm projecting rearwardly from said mounting member, said yieldable means including an elongate rod secured to one end portion of said keeper arm and projecting therefrom, a spring positioned around said rod and bearing against said mounting member and yieldably resisting movement of the keeper arm in a release direction.

3. The safety lock device as defined in claim 2 wherein said rod projects through an opening in said mounting member.

4. The locking device as defined in claim 1, wherein said keeper arm is provided with a downwardly concave plate at one end thereof, the latter being adapted to engage the upper surface of the draw pin when the lock device is applied to the hitch connection between the towing vehicle and the towed implement.

* * * * *